(12) United States Patent
Sun

(10) Patent No.: US 11,549,820 B2
(45) Date of Patent: Jan. 10, 2023

(54) METHOD AND APPARATUS FOR GENERATING NAVIGATION ROUTE AND STORAGE MEDIUM

(71) Applicant: BEIJING BAIDU NETCOM SCIENCE AND TECHNOLOGY CO., LTD., Beijing (CN)

(72) Inventor: Jiefeng Sun, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 194 days.

(21) Appl. No.: 16/323,343

(22) PCT Filed: Dec. 19, 2016

(86) PCT No.: PCT/CN2016/110834
§ 371 (c)(1),
(2) Date: Feb. 5, 2019

(87) PCT Pub. No.: WO2018/058810
PCT Pub. Date: Apr. 5, 2018

(65) Prior Publication Data
US 2021/0293568 A1    Sep. 23, 2021

(30) Foreign Application Priority Data
Sep. 30, 2016   (CN) .......................... 201610877706.5

(51) Int. Cl.
*G01C 21/36* (2006.01)
*G01C 21/34* (2006.01)

(52) U.S. Cl.
CPC ..... *G01C 21/3647* (2013.01); *G01C 21/3446* (2013.01)

(58) Field of Classification Search
CPC ..................... G01C 21/3644; G01C 21/3647
See application file for complete search history.

(56) References Cited

U.S. PATENT DOCUMENTS 6,211,798 B1 * 4/2001 Albrecht .......... G08G 1/096811
340/995.22
10,126,913 B1 * 11/2018 Ho ..................... G01C 21/3635
(Continued)

FOREIGN PATENT DOCUMENTS

| CN | 102121831 A | 7/2011 |
| CN | 103017750 A | 4/2013 |

(Continued)

OTHER PUBLICATIONS

European Patent Application No. 16917555.1 extended Search and Opinion dated Aug. 11, 2020, 15 pages.
(Continued)

*Primary Examiner* — Ryan Rink
(74) *Attorney, Agent, or Firm* — Lathrop GPM LLP

(57) ABSTRACT

Embodiments of the present disclosure provide a method and an apparatus for generating a navigation route and a storage medium. The method includes: determining navigation points from a start point to an end point according to a preset navigation algorithm; determining a target panoramic point according to coordinates of the navigation points and a coordinate of a preset panoramic point; and performing fitting according to the navigation points and the target panoramic point to generate a navigation route map.

15 Claims, 5 Drawing Sheets

(56) References Cited

U.S. PATENT DOCUMENTS

| | | |
|---|---|---|
| 2006/0241854 A1 | 10/2006 | Tu et al. |
| 2008/0079808 A1* | 4/2008 | Ashlock ............ G06F 16/583 348/118 |
| 2009/0240431 A1 | 9/2009 | Chau et al. |
| 2009/0306886 A1* | 12/2009 | Mueller ............ G01C 21/3641 701/533 |
| 2010/0262359 A1 | 10/2010 | Motoyama |
| 2013/0162665 A1* | 6/2013 | Lynch ............ G01C 21/3647 345/589 |
| 2014/0152764 A1 | 6/2014 | Kira et al. |
| 2015/0253142 A1* | 9/2015 | Kornhauser ............ G01C 21/34 701/408 |
| 2015/0326782 A1 | 11/2015 | Lee |
| 2016/0265931 A1 | 9/2016 | Sheridan et al. |

FOREIGN PATENT DOCUMENTS

| | | |
|---|---|---|
| CN | 103644921 A | 3/2014 |
| CN | 104515529 A | 4/2015 |
| CN | 104613975 A | 5/2015 |
| CN | 105157711 A | 12/2015 |
| CN | 105222773 A | 1/2016 |
| CN | 105300392 A | 2/2016 |
| JP | 2003227722 A | 8/2003 |
| JP | 2006349872 A | 12/2006 |
| JP | 2007206014 A | 8/2007 |
| JP | 2008216259 A | 9/2008 |
| JP | 2009250827 A | 10/2009 |
| JP | 2011022295 A | 2/2011 |

OTHER PUBLICATIONS

Singapore Patent Application No. 11201902716U Office Action dated Sep. 10, 2020, 6 pages.
Indian Patent Application No. 201917013891 Office Action dated Oct. 1, 2020, 7 pages.
European Patent Application No. 16917555.1 partial supplementary Search Report dated Apr. 23, 2020, 14 pages.
Chinese Patent Application No. 201610877706.5 Office Action dated Dec. 26, 2018, 7 pages.
Chinese Patent Application No. 201610877706.5 English translation of Office Action dated Dec. 26, 2018, 9 pages.
Singapore Patent Application No. 11201902716U Office Action dated Jan. 21, 2020, 104 pages.
Japanese Patent Application No. 2019-510704 Office Action dated Mar. 3, 2020, 3 pages.
Japanese Patent Application No. 2019-510704 English translation of Office Action dated Mar. 3, 2020, 3 pages.

* cited by examiner

METHOD AND APPARATUS FOR GENERATING NAVIGATION ROUTE AND STORAGE MEDIUM

CROSS-REFERENCE TO RELATED APPLICATION

This application is a US national phase application of International Application No. PCT/CN2016/110834, filed on Dec. 19, 2016, which claims priority to Chinese Patent Application Serial No. 201610877706.5, filed on Sep. 30, 2016 by BEIJING BAIDU NETCOM SCIENCE AND TECHNOLOGY CO., LTD., entitled "Navigation Route Generation Method and Device".

FIELD

The present disclosure relates to a field of route navigation technologies, and in particular, to a method and an apparatus for generating a navigation route and a storage medium.

BACKGROUND

With the advancement of technology, map navigation has become a common function in users' productions and lives. Map navigation provides users with convenient and effective navigation routes for activities such as driving, traveling and the like to ensure that the users can reach the destination smoothly.

In the related art, the navigation route is planned and generated according to navigation points between a start point and an end point on a plane map, such that the user may compare with the navigation route according to the location of the user himself/herself during the traveling process, and smoothly reach the end point.

However, since the above navigation route is generated on the plane map, there is a high requirement for the user's ability of the image recognition. The user may not know how to proceed in the real environment even if he/she obtains the navigation route, making the navigation function failure.

SUMMARY

The object of the present disclosure is to solve at least one of the above technical problems to some extent.

To this end, embodiments of the present disclosure provide a method for generating a navigation route.

Embodiments of the present disclosure provide an apparatus for generating a navigation route.

Embodiments of the present disclosure is to provide a non-volatile computer storage medium.

The method for generating a navigation route provided by embodiments of the present disclosure includes: determining navigation points from a start point to an end point according to a preset navigation algorithm; determining a target panoramic point according to coordinates of the navigation points and a coordinate of a preset panoramic point; and performing fitting according to the navigation points and the target panoramic point to generate a navigation route map.

The apparatus for generating a navigation route provided by embodiments of the present disclosure includes one or more processors; a memory storing instructions executable by the one or more processors; in which the one or more processors is configured to: determine navigation points from a start point to an end point according to a preset navigation algorithm; determine a target panoramic point according to coordinates of the navigation points and a coordinate of a preset panoramic point; and perform fitting according to the navigation points and the target panoramic point to generate a navigation route map.

Embodiments of the present disclosure also provide a non-volatile computer storage medium storing one or more programs, when the one or more programs are executed by a device, the device is caused to perform following acts: determining navigation points from a start point to an end point according to a preset navigation algorithm; determining a target panoramic point according to coordinates of the navigation points and a coordinate of a preset panoramic point; and performing fitting according to the navigation points and the target panoramic point to generate a navigation route map.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

The aforementioned and/or additional aspects and advantages of the present disclosure will become apparent and easy to understand through the following embodiments associated with the accompanying drawings, in which.

DETAILED DESCRIPTION

Figure 1:
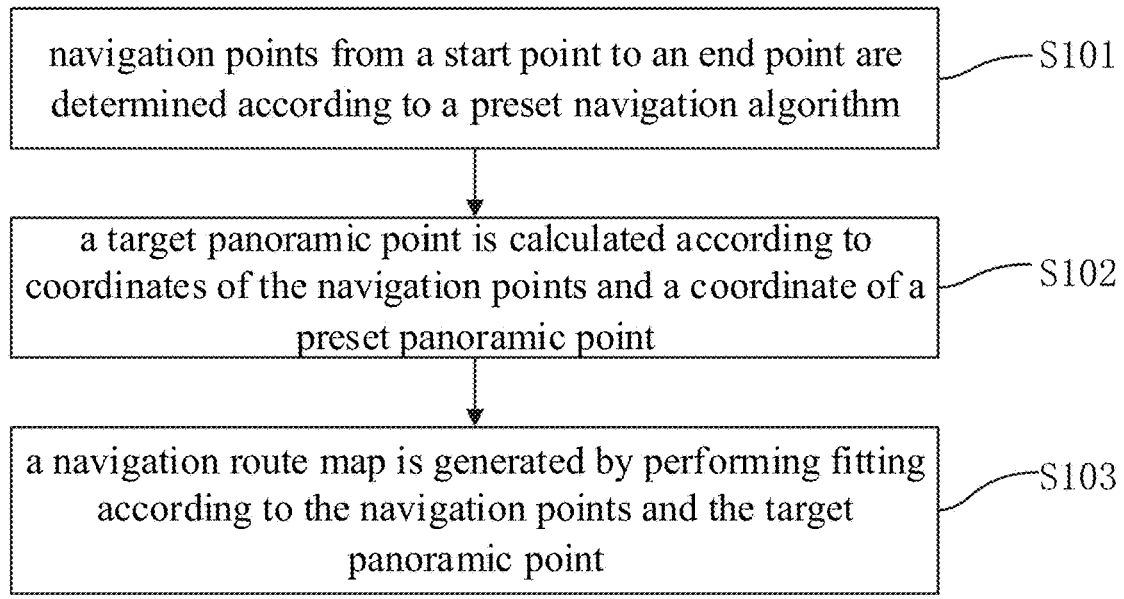
FIG. 1 is a flowchart of a method for generating a navigation route according to an embodiment of the present disclosure.

The embodiments of the present disclosure are described in detail below, and the examples of the embodiments are illustrated in the drawings, in which the same or similar reference numerals are used to refer to the same or similar elements or elements having the same or similar functions. The embodiments described below with reference to the drawings are intended to illustrate the present disclosure and are not to be construed as a limitation.

A method and an apparatus for generating a navigation route according to embodiments of the present disclosure will be described below with reference to the accompanying drawings.

Generally, a method for calculating a navigation route in a plane map is to calculate according to related algorithms (such as, the Dijkstra algorithm). The current position and the traveling direction of the user are represented on the plane map by related positioning functions, and then the user may compare with the navigation route according to the location of the user himself/herself during the traveling process, and smoothly reach the end point.

However, since the navigation route on the plane map is formed by connecting a plurality of navigation points from the start point to the end point, it is only a schematic diagram of a two-dimensional plane. When the user's ability of the image recognition is not strong, he/she cannot combine the real environment with the navigation route. Therefore, the user may not know how to proceed in the real environment even if he/she obtains the navigation route, making the navigation function failure.

In order to solve the above problems, the present disclosure provides a method for generating a navigation route, which may add a panoramic point in the navigation route map, facilitating the user to visually view the navigation route according to the panoramic point and providing convenience for the user during travelling. The details are described as follows.

FIG. 1 is a flowchart of a method for generating a navigation route according to an embodiment of the present disclosure. As shown in the figure, the method includes followings.

At block S101, navigation points from a start point to an end point are determined according to a preset navigation algorithm.

Specifically, when performing a route planning according to the start point and the end point, a preset navigation algorithm is configured to calculate navigation points between the start point and the end point, and the navigation points correspond to locations such as an intersection, a road and the like passing between the start point and the end point. It should be noted that the foregoing preset navigation algorithm may be an A* algorithm, a Dijkstra algorithm and the like.

It should be noted that the method for calculating the navigation points on the route passing through from the start point to the end point by using the preset algorithm may be implemented by a method that implements the same or similar functions in the prior art, and the details are not described herein.

At block S102, a target panoramic point is calculated according to coordinates of the navigation points and a coordinate of a preset panoramic point.

It can be understood that the panoramic point directly reflects the real environment including terrains, roads, buildings and the like. The panoramic point is stitched by images of the real world, which may truly and objectively reflect the image information around a certain location, providing a realistic three-dimensional experience, and the displayed panoramic image can be freely rotated and scaled.

In addition, since the panoramic point is collected along the road based on the panoramic technology, in order to provide a more intuitive navigation, the method for generating the navigation route according to embodiments of the present disclosure introduces the panoramic point between the start point and the end point so as to implement the navigation.

Specifically, the corresponding coordinates for each preset panoramic point may be acquired in advance, such that a target panoramic point is determined according to the coordinates of the navigation points and the coordinate of the preset panoramic point.

It should be noted that, since the panoramic point is generally collected along the road surface 5 to 10 meters, and the position of the navigation point is related to the navigation algorithm for calculation, not every navigation point completely corresponds to the target panoramic point in conformity with its coordinates. In other words, during the process of acquiring the target panoramic point corresponding to the navigation point, the coordinates of the target panoramic point and of the navigation point may have multiple corresponding situations. Therefore, the target panoramic point needs to be determined according to specific situations, which will be described as follows.

In an embodiment of the present disclosure, when the coordinate of the preset panoramic point and the coordinate of the navigation point are the same, i.e., there is two-dimensional display coordinate for the navigation point corresponding to the three-dimensional display coordinate of the preset panoramic point, the target panoramic point with the coordinate same as the coordinate of the navigation point are determined according to the coordinate of the preset panoramic point.

In an embodiment of the present disclosure, when the coordinates of some preset panoramic points are different from the coordinate of the navigation point, but a preset panoramic point are within a relatively close range of the navigation points near them, there is no significant influence on the direction of the navigation if the preset panoramic point is introduced. Therefore, the target panoramic point having a coordinate distance from the navigation point within a preset range may be determined according to the coordinate of the preset panoramic point.

In an embodiment of the present disclosure, when the coordinates of some preset panoramic points are different from the coordinate of the navigation point, but a coordinate of a preset panoramic points is located on a line connecting two navigation points, there is no significant influence on the direction of the navigation if the preset panoramic point is introduced. Therefore, the target panoramic point on the line connecting the navigation points may be determined according to the coordinate of the present panoramic point.

At block S103, a navigation route map is generated by performing fitting according to the navigation points and the target panoramic point.

Specifically, after the target panoramic point is determined, the navigation route map is generated by performing fitting according to the navigation points and the target panoramic point, such that the navigation route may provide the user with a universal navigation function based on the navigation points, and the panoramic point in the navigation route map may also facilitate the user to visually view the navigation route according to the panoramic point, providing convenience for the user during travelling.

It should be noted that, when performing fitting according to the navigation points and the target panoramic point to generate a navigation route map, in order to make the generated navigation route map clear and elegant, a smoothing process may be performed according to the navigation points and the target panoramic point in the actual execution process. The details are described as follows.

In an embodiment of the present disclosure, when the coordinate of the navigation point corresponds to that of the target panoramic point, the navigation point having the same coordinate as that of the target panoramic point may be deleted, and the navigation route map is generated according to the target panoramic point and the remaining navigation points.

In an embodiment of the present disclosure, when the target panoramic point is within a preset distance range from the navigation point in the vicinity, the navigation point within the preset range from the target panoramic point is deleted, and the navigation route map is generated according to the target panoramic point and the remaining navigation points.

In an embodiment of the present disclosure, when the target panoramic point is on a line connecting the navigation points, the target panoramic point on the line connecting the navigation points is inserted, and the navigation route map is generated according to the target panoramic point and the navigation points.

In summary, with the method for generating the navigation route according to embodiments of the present disclosure, navigation points from a start point to an end point are determined according to a preset navigation algorithm, a target panoramic point is determined according to coordinates of the navigation points and a coordinate of a preset panoramic point, and a navigation route map is generated by performing fitting according to the navigation points and the target panoramic point. Therefore, the panoramic point is introduced in the navigation route map, which facilitates the user to visually view the navigation route according to the panoramic point and provides convenience for the user during travelling.

Based on the above embodiments, it should be understood that in order to provide a clear navigation service for the user, a corresponding navigation track route may be rendered in the panoramic area provided by the panoramic point. The details are described as follows.

Figure 2:
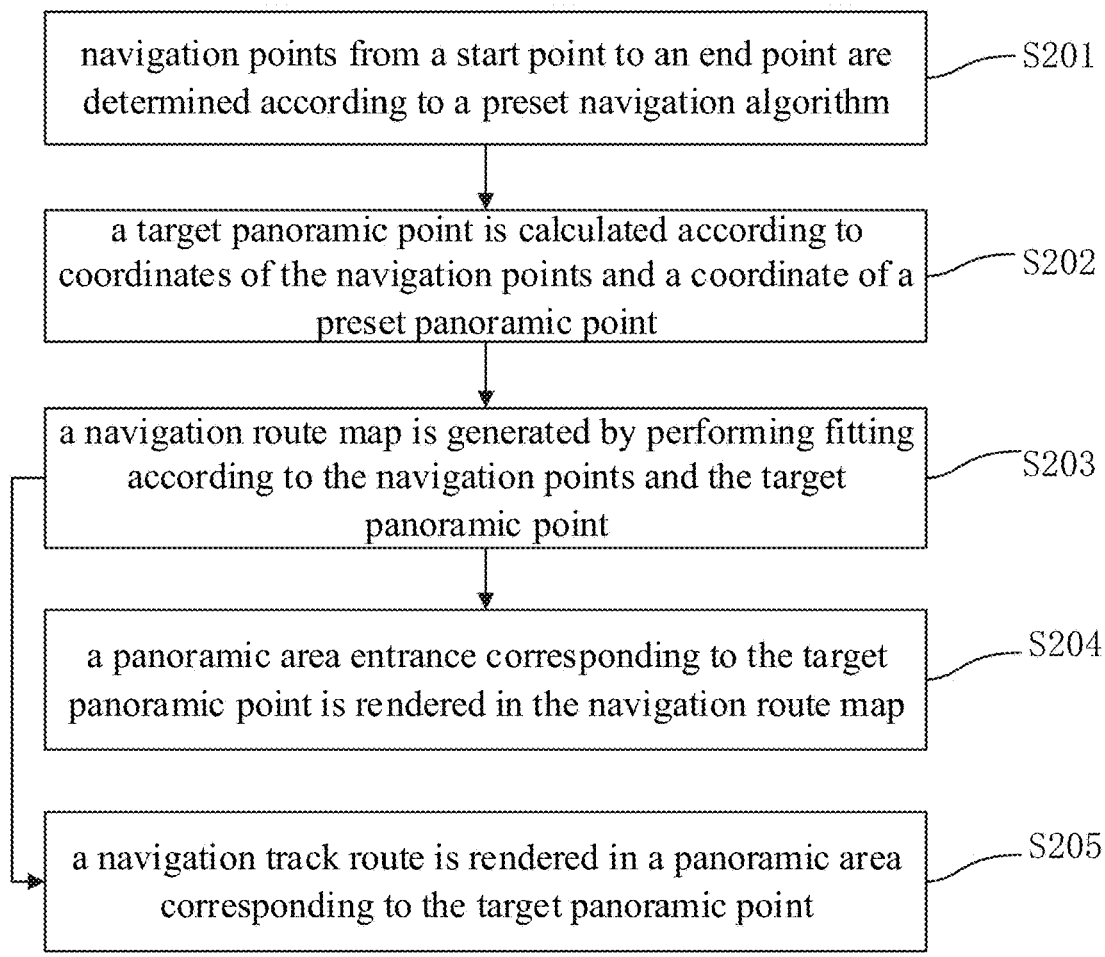
FIG. 2 is a flowchart of a method for generating a navigation route according to an embodiment of the present disclosure.

FIG. 2 is a flowchart of a method for generating a navigation route according to an embodiment of the present disclosure. As shown in FIG. 2, the method includes followings.

At block S201, navigation points from a start point to an end point are determined according to a preset navigation algorithm.

At block S202, a target panoramic point is calculated according to coordinates of the navigation points and a coordinate of a preset panoramic point.

At block S203, a navigation route map is generated by performing fitting according to the navigation points and the target panoramic point.

It should be noted that the foregoing explanations of acts in blocks S101 to S103 are also applicable to the explanations of acts in blocks S201 to S203, which will not be described in detail herein.

At block S204, a panoramic area entrance corresponding to the target panoramic point is rendered in the navigation route map.

It can be understood that, it is possible that the user is particularly familiar with a certain route in the navigation route in practical applications. Therefore, in order to avoid waste of traffic, it is not necessary to provide the user with the panoramic area corresponding to the target panoramic point in this route.

Therefore, in order to selectively provide the panoramic area for the user, when the user is not familiar with the panoramic area corresponding to the target panoramic point in the route, the panoramic area entrance corresponding to the target panoramic point may be rendered in the navigation route map, such that only when the user triggers the relevant entrance, the panoramic area corresponding to the target panoramic point can be rendered in the navigation route map for the user.

For example, when performing fitting according to navigation points between the user's current location and Tsinghua University and a determined target panoramic point to generate a navigation route, a panoramic area entrance corresponding to the target panoramic point may be rendered in the navigation route map.

Figure 3:
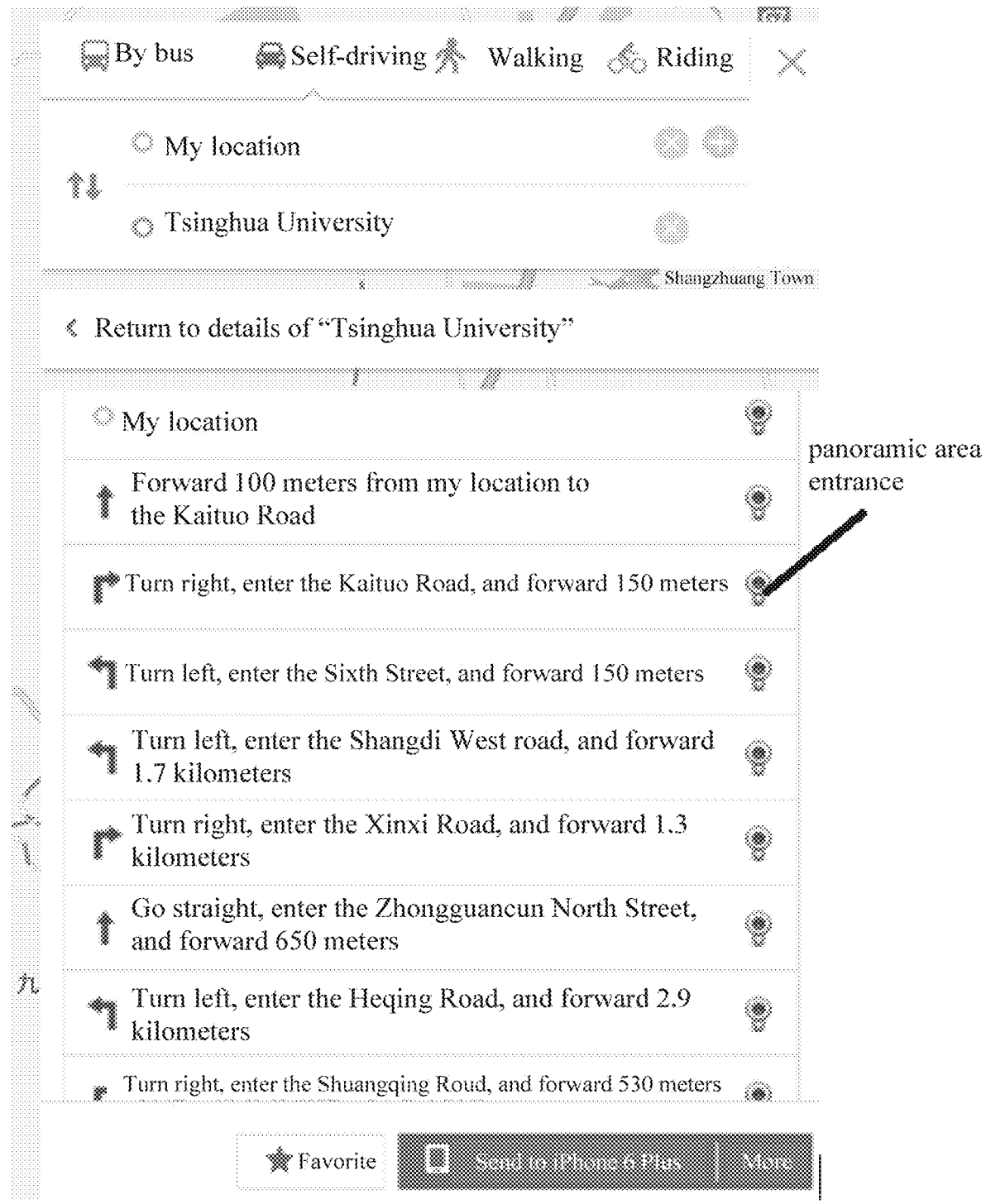
FIG. 3 is a schematic diagram of an interface of a navigation route map with a panoramic area entrance corresponding to a target panoramic point according to an embodiment of the present disclosure.

That is, as shown in FIG. 3, the panoramic area entrances corresponding to the target panoramic points including the Kaituo Road and the Sixth Street may be respectively bound in the navigation route map, such that the user is provided with the panoramic area corresponding to the relevant panoramic points only when the user triggers the corresponding panoramic area entrance.

In addition, it should be noted that, in an embodiment of the present disclosure, the range of the panoramic area rendered for each panoramic point has a certain limit. In order to save the user's traffic, under the premise that the route ahead and behind the panoramic point can be clearly displayed and the user can freely travel within the panoramic area, the navigation route is no longer displayed until the user deviates from the navigation route for a certain distance.

At block S205, a navigation track route is rendered in a panoramic area corresponding to the target panoramic point.

Specifically, in order to ensure that the user can clearly know the current navigation direction in the panoramic area, the navigation track route may also be rendered in the panoramic area corresponding to the target panoramic point.

The navigation track route may be a continuous track in the panoramic area, or may be any other marks indicating the traveling direction, such as an intermittent track, an arrow indicator, and the like.

Figure 4:
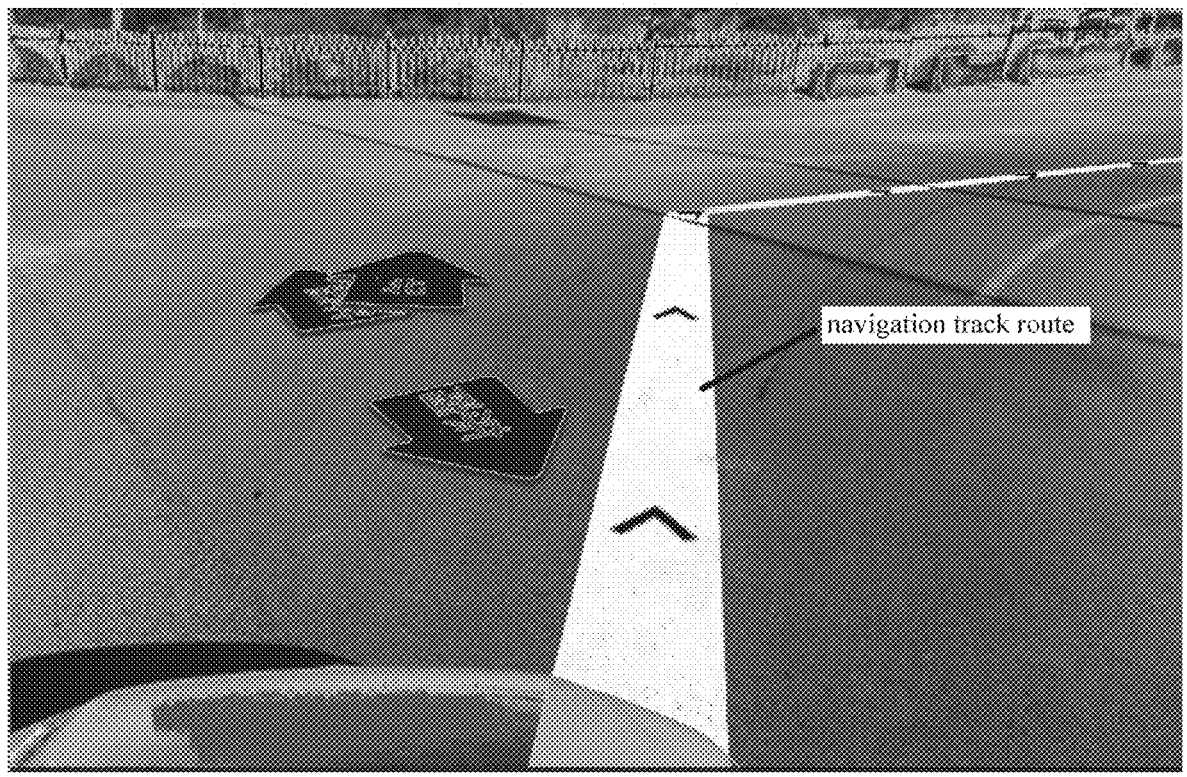
FIG. 4 is a schematic diagram of an interface of a navigation track route in a panoramic area corresponding to a target panoramic point according to an embodiment of the present disclosure.

For example, as shown in FIG. 4, the navigation track route may be provided to indicate the travelling direction for the user at the meantime of entering a certain target panoramic point and displaying the panoramic area corresponding to the target panoramic point.

It should be noted that, different manners may be used to render the navigation track route in the panoramic area corresponding to the target panoramic point according to different application scenarios. Examples are taken as follows.

As an example, reference coordinates corresponding to the navigation route may be determined in the panoramic area, and the navigation track route is rendered in the panoramic area according to the reference coordinates.

In summary, with the method for generating the navigation route according to the embodiment of the present disclosure, after the navigation route map is generated by performing fitting according to the navigation points and the target panoramic point, the navigation track route is rendered in the panoramic area corresponding to the target panoramic point. Therefore, it is ensured that the user may clearly know the current navigation direction in the panoramic area, providing convenience to the user during travelling.

In order to implement the above embodiments, the present disclosure also provides an apparatus for generating a navigation route.

Figure 5:
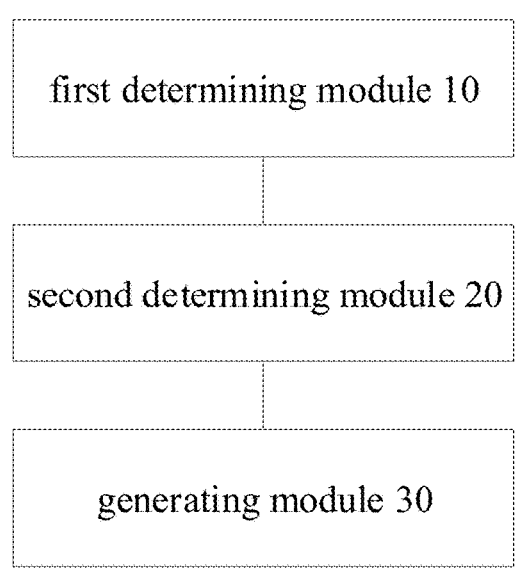
FIG. 5 is a schematic structural diagram of an apparatus for generating a navigation route according to an embodiment of the present disclosure.

FIG. 5 is a schematic structural diagram of an apparatus for generating a navigation route according to an embodiment of the present disclosure. As shown in FIG. 5, the apparatus for generating the navigation route includes: a first determining module 10, a second determining module 20, and a generating module 30.

The first determining module 10 is configured to determine navigation points from a start point to an end point according to a preset navigation algorithm.

Specifically, when performing a route planning according to the start point and the end point, the first determining module 10 needs to use a preset navigation algorithm to calculate navigation points between the start point and the end point. The navigation points correspond to locations such as an intersection, a road and the like on the route passing through from the start point to the end point.

The second determining module 20 is configured to determine a target panoramic point according to coordinates of the navigation points and a coordinate of a preset panoramic point.

Specifically, the corresponding coordinates for each preset panoramic point may be acquired in advance, such that the second determining module 20 may determine a target panoramic point according to the coordinates of the navigation points and the coordinate of the preset panoramic point.

It should be noted that, since the panoramic point is generally collected along the road surface 5 to 10 meters, and the position of the navigation point is related to the navigation algorithm for calculation, not every navigation point completely corresponds to the target panoramic point in conformity with its coordinates. In other words, during the process of the second determining module 20 acquiring the target panoramic point corresponding to the navigation point, the coordinates of the target panoramic point and of the navigation point may have multiple corresponding situations. Therefore, the target panoramic point needs to be determined according to specific situations, which will be described as follows.

In an embodiment of the present disclosure, when the coordinate of the preset panoramic point and the coordinate of the navigation point are the same, i.e., there is two-dimensional display coordinate for the navigation point corresponding to the three-dimensional display coordinate of the preset panoramic point, the second determining module 20 may determine the target panoramic point with the coordinate same as the coordinate of the navigation point according to the coordinate of the preset panoramic point.

In an embodiment of the present disclosure, when the coordinates of some preset panoramic points are different from the coordinate of the navigation point, but a preset panoramic point are within a relatively close range of the navigation points near them, there is no significant influence on the direction of the navigation if the preset panoramic point is introduced. Therefore, the second determining module 20 may determine the target panoramic point having a coordinate distance from the navigation point within a preset range according to the coordinate of the preset panoramic point.

In an embodiment of the present disclosure, when the coordinates of some preset panoramic points are different from the coordinate of the navigation point, but a coordinate of a preset panoramic points is located on a line connecting two navigation points, there is no significant influence on the direction of the navigation if the preset panoramic point is introduced. Therefore, the second determining module 20 may determine the target panoramic point on the line connecting the navigation points according to the coordinate of the present panoramic point.

The generating module 30 is configured to perform fitting according to the navigation points and the target panoramic point to generate a navigation route map.

Specifically, after the target panoramic point is determined, the generating module 30 performs fitting according to the navigation points and the target panoramic point to generate the navigation route map, such that the navigation route may provide the user with a universal navigation function based on the navigation points, and the panoramic point in the navigation route map may also facilitate the user to visually view the navigation route according to the panoramic point, providing convenience for the user during travelling.

It should be noted that, when performing fitting according to the navigation points and the target panoramic point to generate a navigation route map, in order to make the generated navigation route map clear and elegant, the generating module 30 may perform a smoothing process according to the navigation points and the target panoramic point in the actual execution process. The details are described as follows.

In an embodiment of the present disclosure, when the coordinate of the navigation point corresponds to that of the target panoramic point, the generating module 30 may delete the navigation point having the same coordinate as that of the target panoramic point, and generate the navigation route map according to the target panoramic point and the remaining navigation points.

In an embodiment of the present disclosure, when the target panoramic point is within a preset distance range from the navigation point in the vicinity, the generating module 30 may delete the navigation point within the preset range from the target panoramic point, and generate the navigation route map according to the target panoramic point and the remaining navigation points.

In an embodiment of the present disclosure, when the target panoramic point is on a line connecting the navigation points, the generating module 30 may insert the target panoramic point on the line connecting the navigation points, and generate the navigation route map according to the target panoramic point and the navigation points.

It should be noted that the foregoing explanations of the method for generating a navigation route are also applicable to the apparatus for generating a navigation route according to the embodiment of the present disclosure, and the implementation principles thereof are similar, which will not be described in detail herein.

In summary, with the apparatus for generating the navigation route according to embodiments of the present disclosure, navigation points from a start point to an end point are determined according to a preset navigation algorithm, a target panoramic point is determined according to coordinates of the navigation points and a coordinate of a preset panoramic point, and a navigation route map is generated by performing fitting according to the navigation points and the target panoramic point. Therefore, the panoramic point is introduced in the navigation route map, which facilitates the user to visually view the navigation route according to the panoramic point and provides convenience for the user during travelling.

Based on the above embodiments, it should be understood that in order to provide a clear navigation service for the user, a corresponding navigation track route may be rendered in the panoramic area provided by the panoramic point. The details are described as follows.

Figure 6:
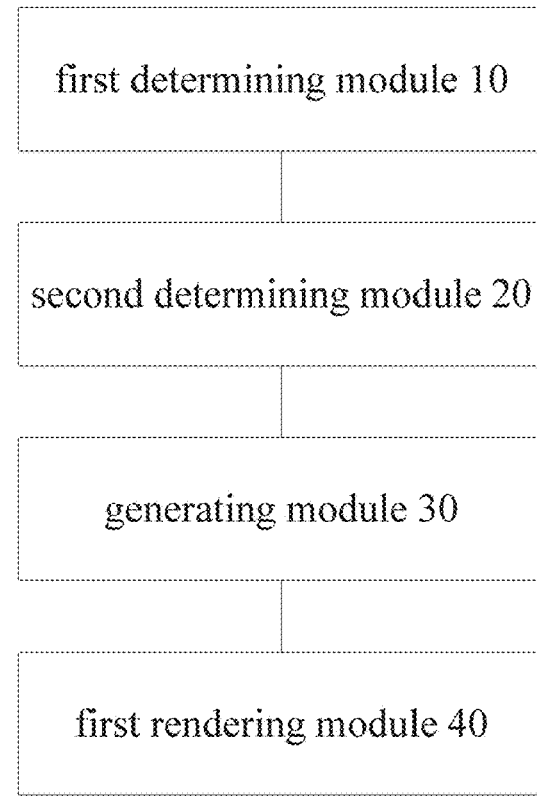
FIG. 6 is a schematic structural diagram of an apparatus for generating a navigation route according to another embodiment of the present disclosure.

FIG. 6 is a schematic structural diagram of an apparatus for generating a navigation route according to another embodiment of the present disclosure. As shown in FIG. 6, based on the illustration of FIG. 5, the apparatus for generating the navigation route also includes a first rendering module 40.

The first rendering module 40 is configured to render a panoramic area entrance corresponding to the target panoramic point in the navigation route map.

It can be understood that, it is possible that the user is particularly familiar with a certain route in the navigation route in practical applications. Therefore, in order to avoid waste of traffic, it is not necessary to provide the user with the panoramic area corresponding to the target panoramic point in this route.

Therefore, in order to selectively provide the panoramic area for the user, when the user is not familiar with the panoramic area corresponding to the target panoramic point in the route, the first rendering module 40 may render the panoramic area entrance corresponding to the target panoramic point in the navigation route map, such that only when the user triggers the relevant entrance, the panoramic area corresponding to the target panoramic point can be rendered in the navigation route map for the user.

Figure 7:
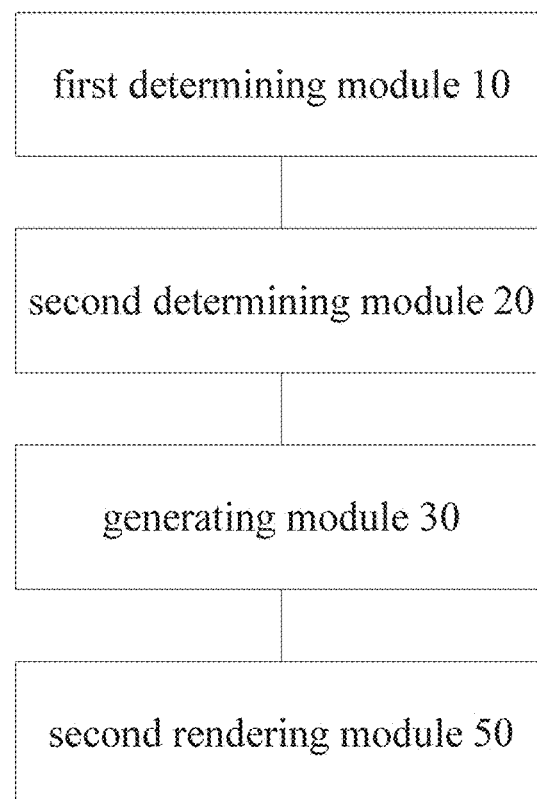
FIG. 7 is a schematic structural diagram of an apparatus for generating a navigation route according to yet another embodiment of the present disclosure.

FIG. 7 is a schematic structural diagram of an apparatus for generating a navigation route according to yet another embodiment of the present disclosure. As shown in FIG. 7, based on the illustration of FIG. 5, the apparatus for generating the navigation route also includes a second rendering module 50.

Specifically, in order to ensure that the user can clearly know the current navigation direction in the panoramic area, the second rendering module 50 may also render the navigation track route in the panoramic area corresponding to the target panoramic point.

The navigation track route may be a continuous track in the panoramic area, or may be any other marks indicating the traveling direction, such as an intermittent track, an arrow indicator, and the like.

Figure 8:
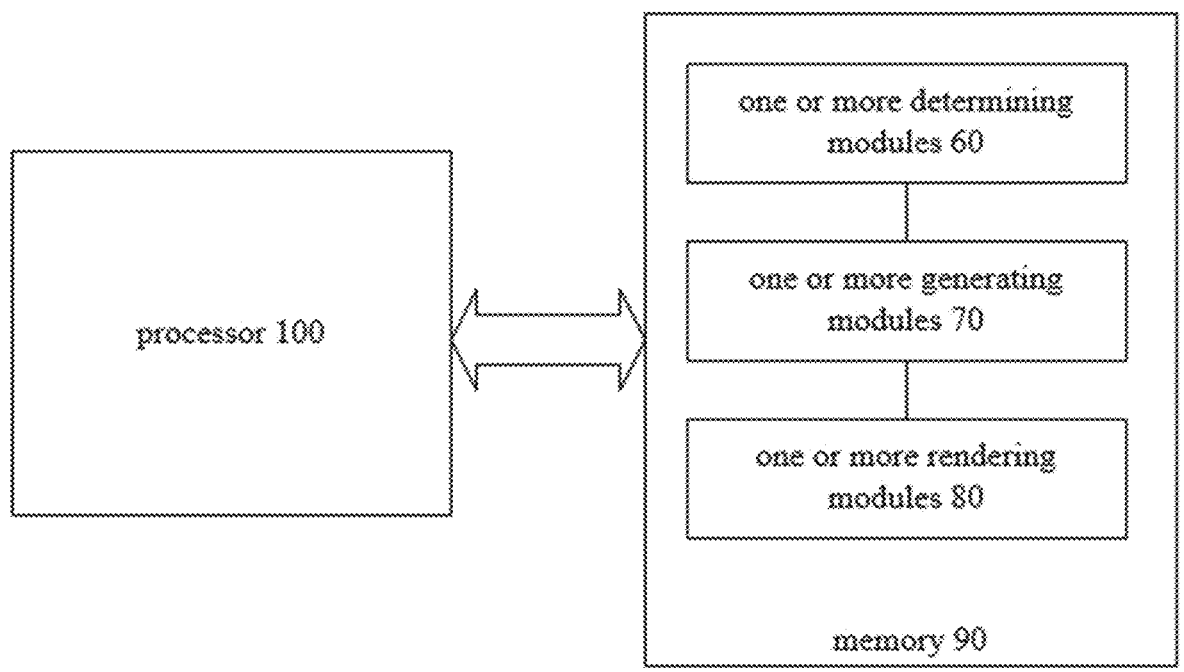
FIG. 8 is a schematic structural diagram of a device for generating a navigation route for any of the embodiments of the present disclosure.

FIG. 8 is a schematic structural diagram of a device for generating a navigation route including the apparatus of any of FIGS. 5-7. The device includes a memory 90 which may include one or more determining modules 60, one or more generating modules 70 and one or more rendering modules 80. The one or more determining modules 60 may include, for example, first determining module 10 and second determining module 20. The one or more generating modules 70 may include, for example, generating module 30. The one or more rendering modules 80 may include, for example, first rendering module 40 and second rendering module 50. The one or more determining modules 60, one or more generating modules 70 and one or more rendering modules 80 may be understood as programs stored in memory 90 for execution by processor 100. In embodiments, processor 100 may represent one or more processors.

It should be noted that the foregoing explanations of the method for generating a navigation route are also applicable to the apparatus for generating a navigation route according to the embodiment of the present disclosure, and the implementation principles thereof are similar, which will not be described in detail herein.

In summary, with the apparatus for generating the navigation route according to the embodiment of the present disclosure, after the navigation route map is generated by performing fitting according to the navigation points and the target panoramic point, the navigation track route is rendered in the panoramic area corresponding to the target panoramic point. Therefore, it is ensured that the user may clearly know the current navigation direction in the panoramic area, providing convenience to the user during travelling.

In the description of the present specification, the descriptions with reference to the terms "one embodiment", "some embodiments", "example", "specific example", or "some examples" and the like mean that specific features, structures, materials or characteristics described in connection with an embodiment or an example are included in at least one embodiment or example of the present disclosure. In the present specification, the schematic representations of the above terms are not necessarily directed to the same embodiment or example. Furthermore, the described specific features, structures, materials, or characteristics may be combined in any one or more embodiments or examples in a suitable manner. In addition, those skilled in the art may incorporate and combine various embodiments or examples and features of various embodiments or examples described in the specification without causing any contradiction.

Although the embodiments of the present disclosure have been illustrated and described above, it can be understood that the above-described embodiments are illustrative and are not to be construed as a limitation of the scope of the present disclosure. Those skilled in the art may change, modify, substitute and vary the above embodiments within the scope of the present disclosure.

What is claimed is:

1. A method for generating a navigation route, comprising:
   determining navigation points from a start point to an end point of the navigation route according to a preset navigation algorithm;
   determining a target panoramic point according to coordinates of the navigation points and a coordinate of a preset panoramic point, comprising determining the target panoramic point on a line connecting the coordinates of navigation points according to the coordinate of the preset panoramic point;
   performing fitting according to the navigation points and the target panoramic point to generate a navigation route map, comprising inserting the target panoramic point on a line connecting the navigation points, and generating the navigation route map according to the target panoramic point and the navigation points; and,
   rendering a navigation track route in a panoramic area rendered for each of the target panoramic points;
   wherein,
   a range of the panoramic area rendered for each target panoramic point has a preset limit, and,
   when the navigation route ahead and behind a given panoramic point of the target panoramic points is such that a user will freely travel along the navigation route corresponding to the panoramic area, the navigation track route is not displayed in a given panoramic area corresponding to the given panoramic point until the navigation route is deviated for a certain distance.

2. The method according to claim 1, determining the target panoramic point according to the coordinates of the navigation points and the coordinate of the preset panoramic point comprising:
   determining the target panoramic point having the coordinate same as a coordinate of a navigation point among the navigation points according to the coordinate of the preset panoramic point; or
   determining the target panoramic point having a coordinate distance from a navigation point among the navigation points within a preset range according to the coordinate of the preset panoramic point.

3. The method according to claim 1, performing fitting according to the navigation points and the target panoramic point to generate the navigation route map comprising:
deleting a navigation point among the navigation points which has a coordinate same as the coordinate of the target panoramic point, and generating the navigation route map according to the target panoramic point and remaining navigation points; or
deleting a navigation point among the navigation points which has a coordinate distance from the target panoramic point within a preset range, and generating the navigation route map according to the target panoramic point and remaining navigation points.

4. The method according to claim 1, after performing fitting according to the navigation points and the target panoramic point to generate the navigation route map, the method further comprising:
rendering a panoramic area entrance corresponding to the target panoramic point in the navigation route map.

5. The method according to claim 1, the rendering the navigation track route in the panoramic area comprising:
determining a reference coordinate in the panoramic area; and
rendering the navigation track route in the panoramic area according to the reference coordinate.

6. An apparatus for generating a navigation route, comprising:
one or more processors;
a memory storing instructions executable by the one or more processors;
the one or more processors being configured to:
determine navigation points from a start point to an end point of the navigation route according to a preset navigation algorithm;
determine a target panoramic point according to coordinates of the navigation points and a coordinate of a preset panoramic point by determining the target panoramic point on a line connecting the coordinates of navigation points according to the coordinate of the preset panoramic point;
perform fitting according to the navigation points and the target panoramic point to generate a navigation route map by inserting the target panoramic point on a line connecting the navigation points, so as to generate the navigation route map according to the target panoramic point and the navigation points; and
render a navigation track route in a panoramic area rendered for each of the target panoramic points;
wherein,
a range of the panoramic area rendered for each target panoramic point has a preset limit, and,
when the navigation route ahead and behind a given panoramic point of the target panoramic points is such that a user will freely travel along the navigation route corresponding to the panoramic area, the navigation track route is not displayed in a given panoramic area corresponding to the given panoramic point until the navigation route is deviated for a certain distance.

7. The apparatus according to claim 6, the one or more processors being configured to determine the target panoramic point according to the coordinates of the navigation points and the coordinate of the preset panoramic point by performing:
determining the target panoramic point having the coordinate same as a coordinate of a navigation point among the navigation points according to the coordinate of the preset panoramic point; or
determining the target panoramic point having a coordinate distance from a navigation point among the navigation points within a preset range according to the coordinate of the preset panoramic point.

8. The apparatus according to claim 6, the one or more processors being configured to perform fitting according to the navigation points and the target panoramic point to generate the navigation route map by performing:
deleting a navigation point among the navigation points which has a coordinate same as the coordinate of the target panoramic point, and generate the navigation route map according to the target panoramic point and remaining navigation points; or
deleting a navigation point among the navigation points which has a coordinate distance from the target panoramic point within a preset range, and generate the navigation route map according to the target panoramic point and remaining navigation points.

9. The apparatus according to claim 6, the one or more processors being further configured to:
render a panoramic area entrance corresponding to the target panoramic point in the navigation route map.

10. The apparatus according to claim 6, the one or more processors being configured to render the navigation track route in the panoramic area by performing acts of:
determining a reference coordinate in the panoramic area; and
rendering the navigation track route in the panoramic area according to the reference coordinate.

11. A non-volatile computer storage medium, storing one or more programs, when the one or more programs are executed by a device, the device being caused to perform following acts:
determining navigation points from a start point to an end point of the navigation route according to a preset navigation algorithm;
determining a target panoramic point according to coordinates of the navigation points and a coordinate of a preset panoramic point, comprising determining the target panoramic point on a line connecting the coordinates of navigation points according to the coordinate of the preset panoramic point;
performing fitting according to the navigation points and the target panoramic point to generate a navigation route map, comprising inserting the target panoramic point on a line connecting the navigation points, and generating the navigation route map according to the target panoramic point and the navigation points; and,
rendering a navigation track route in a panoramic area rendered for each of the target panoramic points;
wherein,
a range of the panoramic area rendered for each target panoramic point has a preset limit, and,
when the navigation route ahead and behind a given panoramic point of the target panoramic points is such that a user will freely travel along the navigation route corresponding to the panoramic area, the navigation track route is not displayed in a given panoramic area corresponding to the given panoramic point until the navigation route is deviated for a certain distance.

12. The method according to claim 2, performing fitting according to the navigation points and the target panoramic point to generate the navigation route map comprising:
   deleting a navigation point among the navigation points which has a coordinate same as the coordinate of the target panoramic point, and generating the navigation route map according to the target panoramic point and remaining navigation points; or
   deleting a navigation point among the navigation points which has a coordinate distance from the target panoramic point within a preset range, and generating the navigation route map according to the target panoramic point and remaining navigation points.

13. The method according to claim 2, after performing fitting according to the navigation points and the target panoramic point to generate the navigation route map, the method further comprising:
   rendering a panoramic area entrance corresponding to the target panoramic point in the navigation route map.

14. The method according to claim 3, after performing fitting according to the navigation points and the target panoramic point to generate the navigation route map, the method further comprising:
   rendering a panoramic area entrance corresponding to the target panoramic point in the navigation route map.

15. The method according to claim 2, rendering the navigation track route in the panoramic area corresponding to the target panoramic point comprising:
   determining a reference coordinate in the panoramic area; and
   rendering the navigation track route in the panoramic area according to the reference coordinate.

\* \* \* \* \*